United States Patent [19]

Laybourn

[11] Patent Number: 5,027,862
[45] Date of Patent: Jul. 2, 1991

[54] HOSE REPAIR CONNECTOR APPARATUS

[76] Inventor: Bradley K. Laybourn, HC 01 Box 6219, Palmer, Ak. 99645

[21] Appl. No.: 493,627

[22] Filed: Mar. 15, 1990

[51] Int. Cl.$^5$ .............................................. F16L 55/00
[52] U.S. Cl. ........................................ 138/99; 138/97; 138/110; 29/402.09
[58] Field of Search ............... 138/97, 99, 110, 109, 138/177, 178, 96 R; 285/15; 29/402.09; 137/375

[56] References Cited

U.S. PATENT DOCUMENTS

| | | | |
|---|---|---|---|
| 2,942,625 | 6/1960 | Costanzo | 138/96 R |
| 3,228,712 | 1/1966 | Hausmann et al. | 138/99 |
| 3,368,005 | 2/1968 | Buczala et al. | 285/15 |
| 4,053,176 | 10/1977 | Hilbush | 285/15 |
| 4,207,918 | 6/1980 | Burns et al. | 138/99 |
| 4,323,526 | 4/1982 | Hilbush | 285/15 |
| 4,448,218 | 5/1984 | Vetter | 138/99 |
| 4,552,183 | 11/1985 | Chick | 138/99 |
| 4,556,082 | 12/1985 | Riley et al. | 137/375 |
| 4,643,229 | 2/1987 | Hickin | 138/109 |

FOREIGN PATENT DOCUMENTS

| | | | |
|---|---|---|---|
| 1166335 | 10/1969 | United Kingdom | 285/15 |
| 2080916 | 2/1982 | United Kingdom | 285/15 |

Primary Examiner—James E. Bryant, III
Attorney, Agent, or Firm—Leon Gilden

[57] ABSTRACT

A hose repair connector apparatus is set forth for the repair connection of various pipe, including an elongate flexible hose, including flexible drawstrings directed circumferentially proximate each end of the hose through circumferential slots. A modified embodiment includes a polymeric sealing ring underlying each drawstring, wherein each drawstring is captured within a pocket between the ring and exterior portion of the hose. A further modified embodiment includes a plurality of coaxial flexible hoses secured together by heat seaming at proximate terminal ends thereof, with a pneumatic valve directed into a chamber defined between the exterior and interior hoses to create back pressure against a rupture in an existing pipe.

3 Claims, 4 Drawing Sheets

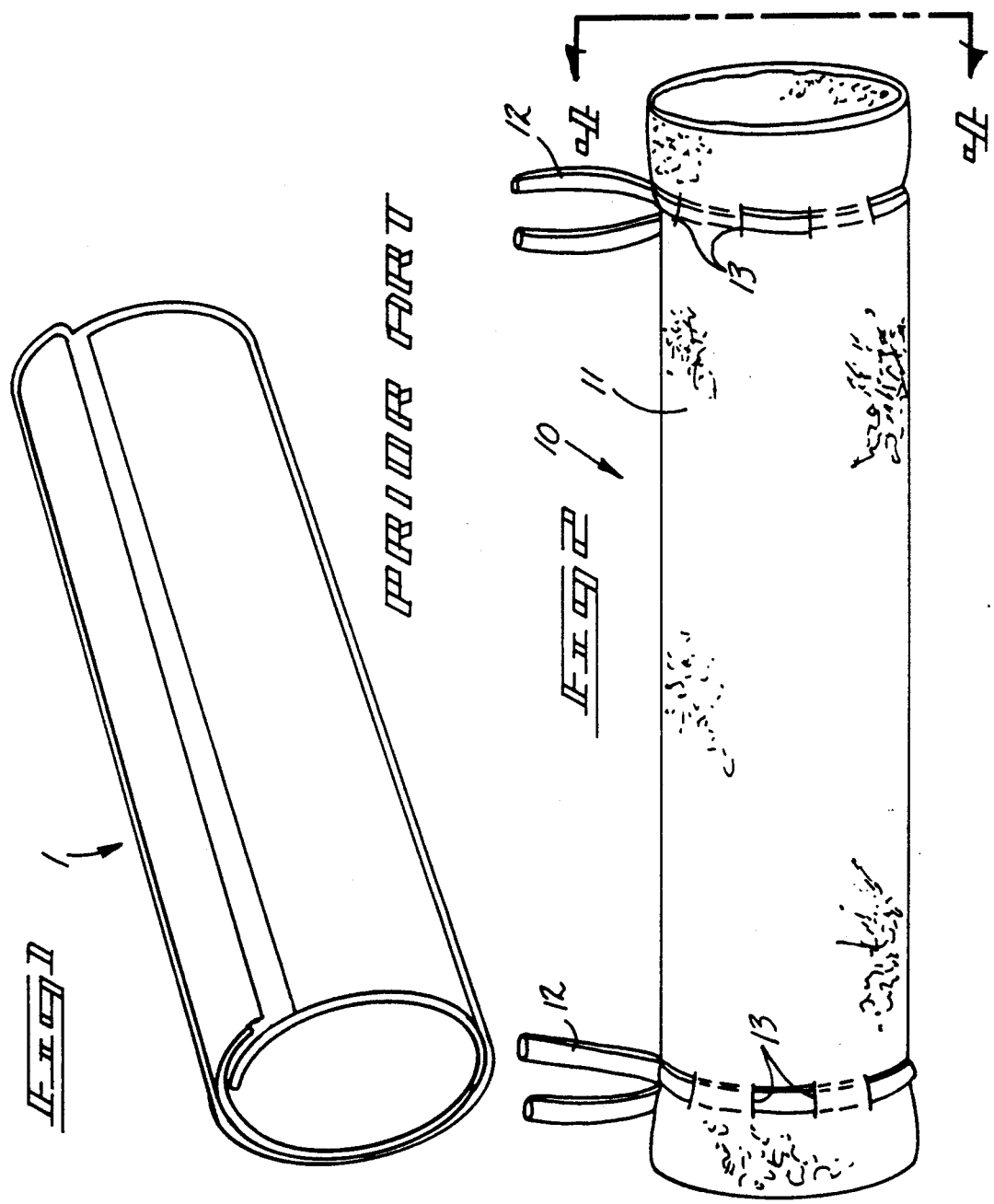

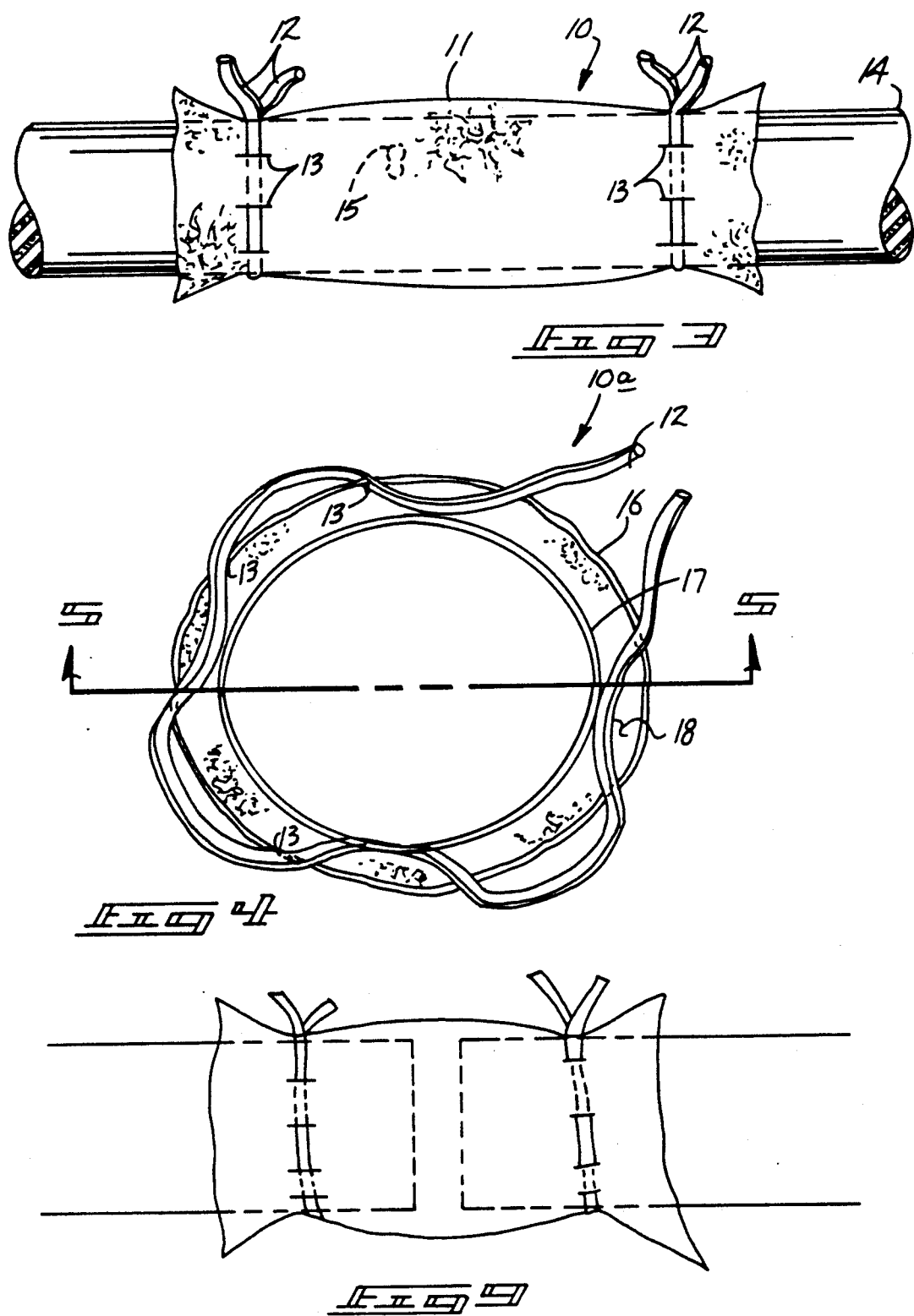

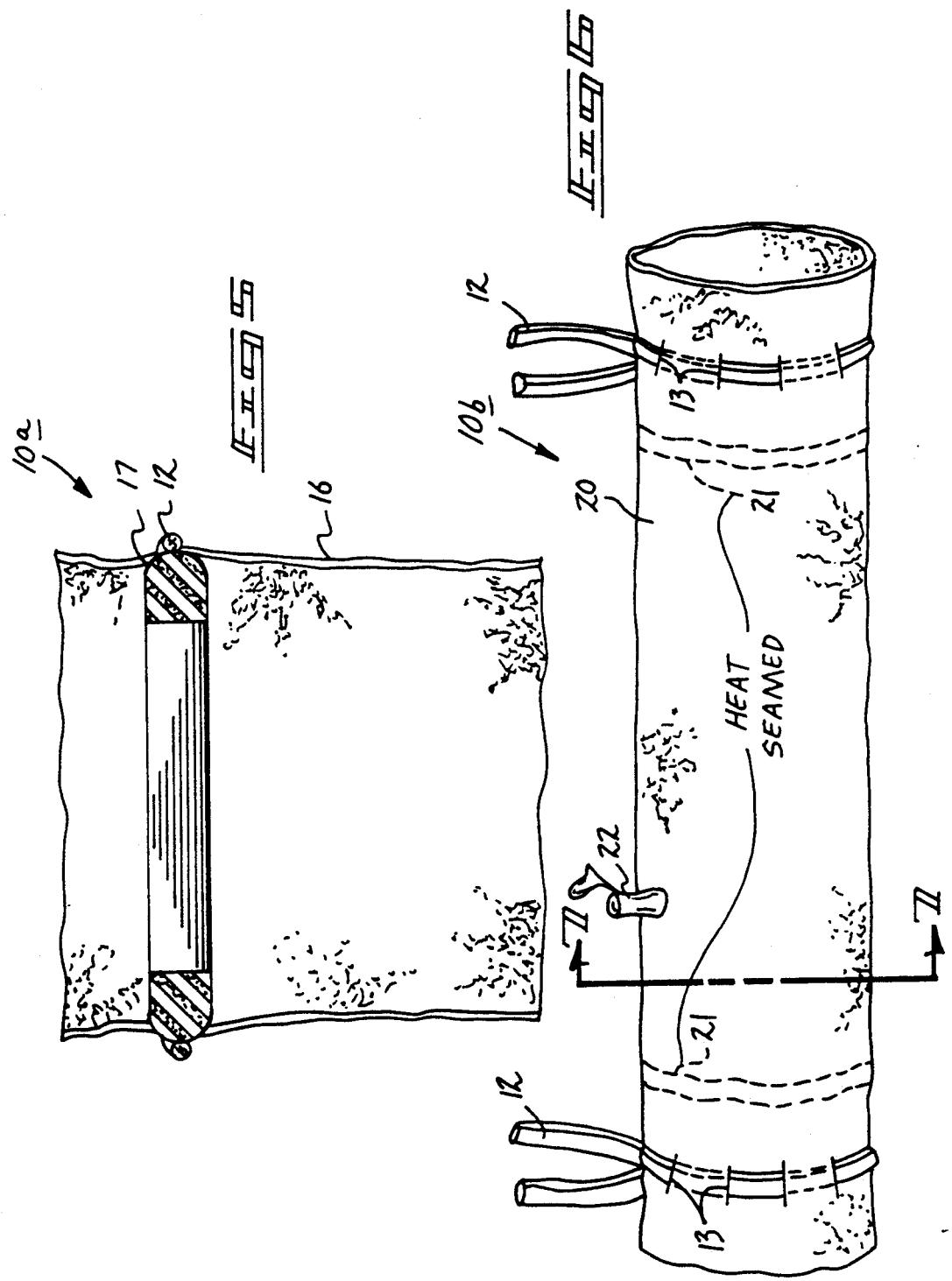

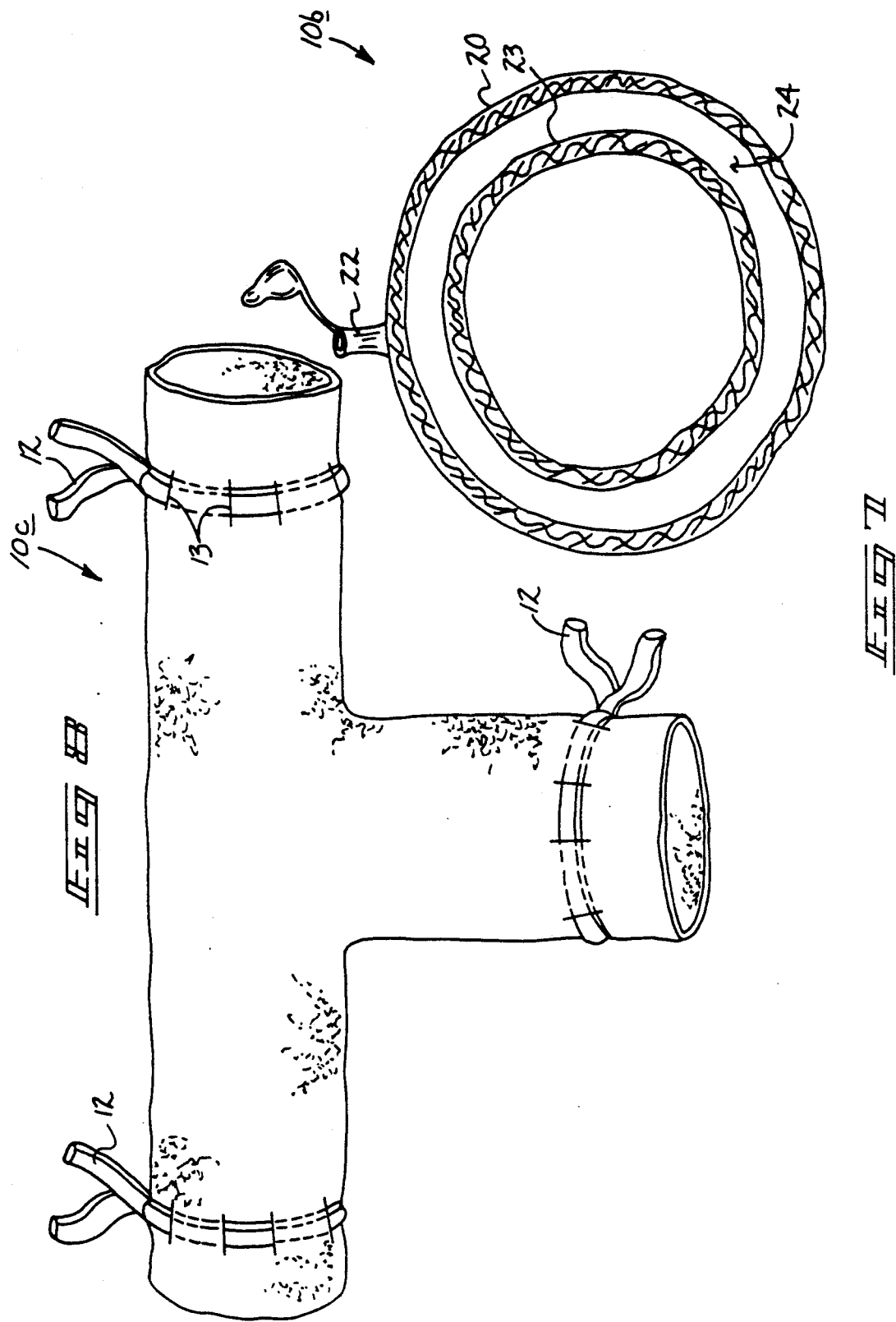

HOSE REPAIR CONNECTOR APPARATUS

BACKGROUND OF THE INVENTION

1. Field of the Invention

The field of invention relates to repair connector hose structure, and more particularly pertains to a new and improved hose repair apparatus for encompassing and enclosing a rupture in an existing hose to maintain fluid and/or air flow integrity of the hose; and as a hose connector apparatus used for connecting one existing hose to another or connecting a hose to a source (i.e.), heater, oil lines, etc.).

2. Description of the Prior Art

Hose repair organizations of various types have been utilized to repair broken, split, and defective sections in lengths of hose to avoid costly repair of such hose and extend effective life of a hose section, as well as avoiding inconvenience of fitting and replacement of hose section. Examples of prior art hose repair organizations may be found in U.S. Pat. No. 4,647,072 to Westman wherein a flexible length of hose is surmounted about an existing pipe section with various clips and fasteners to secure the flexible hose thereto.

U.S. Pat. No. 3,495,629 to Botsolas sets forth a repair covering for pipe fittings wherein a flexible resilient material is formed of a single structure overlying a pipe portion for repair thereof.

U.S. Pat. No. 4,705,078 to Montgomery sets forth a pipe repair clamp arrangement wherein a flexible metal band overlies an elastomeric gasket sheet attached to the metal band, wherein the gasket overlaps itself to provide an encircling securement of the underlying pipe for repair thereof.

U.S. Pat. No. 3,315,986 to Quick sets forth a connector for connecting spaced conduits, wherein the connector includes a sleeve member for reception within each of the spaced conduits, wherein the sleeve member includes a central portion and further including heat shrinkable tubes to overlie the sleeve portions for securement and clamping of the sleeve portions to the conduit being repaired.

U.S. Pat. No. 3,616,516 to Corriston sets forth a method and apparatus for repairing insulated pipe, wherein a section of the pipe to be repaired is removed with surrounding insulation also removed, wherein end seals are inserted into the annular space formed by removal of the insulated material aligned with the central transfer pipes of the insulated pipe to be repaired.

As such, it may be appreciated that there is a continuing need for a new and improved hose repair connector apparatus wherein the same addresses both the problems of ease of use and effectiveness in construction and in this respect, the present invention substantially fulfills this need.

SUMMARY OF THE INVENTION

In view of the foregoing disadvantages inherent in the known types of hose repair organizations now present in the prior art, the present invention provides a hose repair connector apparatus wherein the same sets forth a predetermined length of flexible hose to overlie in a surrounding relationship a rupture of an existing pipe and/or the connecting of one hose to another or to a source. As such, the general purpose of the present invention, which will be described subsequently in greater detail, is to provide a new and improved hose repair connector apparatus which has all the advantages of the prior art hose repair organizations and none of the disadvantages.

To attain this, the present invention includes a hose apparatus for the repair and/or connection of various pipe, including an elongate flexible hose, including flexible drawstrings directed circumferentially proximate each end of the hose through circumferential slots. A modified embodiment includes a polymeric sealing ring underlying each drawstring, wherein each drawstring is captured within a pocket between the ring and exterior portion of the hose. A further modified embodiment includes a plurality of coaxial flexible hoses secured together by heat seaming at proximate terminal ends thereof, with a pneumatic valve directed into a chamber defined between the exterior and interior hoses to create back pressure against a rupture in an existing pipe.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Ofifce and the Public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hose repair connector apparatus which has all the advantages of the prior art hose repair organizations and none of the disadvantages.

It is another object of the present invention to provide a new and improved hose repair connector apparatus which may be easily and efficiently manufactured and marketed.

It is a further object of the present invention to provide a new and improved hose repair connector apparatus which is of a durable and reliable construction.

An even further object of the present invention is to provide a new and improved hose repair connector apparatus which is susceptible of a low cost of manufacture with regard to both materials and labor, and which accordingly is then susceptible of low prices of sale to the consuming public, thereby making such hose repair connector apparatus economically available to the buying public.

Still yet another object of the present invention is to provide a new and improved hose repair connector apparatus which provides in the apparatuses and methods of the prior art some of the advantages thereof, while simultaneously overcoming some of the disadvantages normally associated therewith.

Still another object of the present invention is to provide a new and improved hose repair connector apparatus wherein the same is of a flexible and impermeable construction to surroundingly overlie and sealingly enclose a pipe rupture; and be used in a connecting capability.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art hose repair organization.

FIG. 2 is an isometric illustration of the hose repair connector apparatus of the instant invention.

FIG. 3 is an isometric illustration taken in elevation of the hose repair connector apparatus of the instant invention surrounding an existing pipe.

FIG. 4 is an orthographic end view taken in elevation of a modified hose repair connector apparatus of the instant invention.

FIG. 5 is an orthographic view taken along the lines 5—5 of FIG. 4 in the direction indicated by the arrows.

FIG. 6 is an isometric illustration of a further modified hose repair connector apparatus of the instant invention.

FIG. 7 is an orthographic view taken along the lines 7—7 in the direction indicated by the arrows.

FIG. 8 is an isometric illustration of a hose repair connector apparatus of the instant invention adapted to a pipe intersection.

FIG. 9 is an isometric illustration of a hose repair connector apparatus of the instant invention used to connect one hose to another.

DESCRIPTION OF THE PREFERRED EMBODIMENT

With reference now to the drawings, and in particular to FIGS. 1 to 9 thereof, a new and improved hose repair connector apparatus embodying the principles and concepts of the present invention and generally designated by the reference numerals 10, 10a, 10b, and 10c will be described.

FIG. 1 is illustrative of a typical prior art wrapping 1 for a hose to define an overlapping securement about an existing hose when the prior art device is secured thereabout.

More specifically, the hose repair connector apparatus 10 of the instant invention essentially comprises an elongate, flexible, cylindrical fabric hose member 11 formed of a variety of fluid/air impermeable material, such as canvas, polymerics, and the like. Proximate each terminal end of the hose member 11 is a circumferentially surrounding drawstring 12 orthogonally positioned through circumferential slots 13 of the hose, wherein the slots and drawstring are orthogonally oriented relative to an axis of the hose 11, wherein the drawstrings 12 are tightened and secured subsequent to insertion of a pipe within the hose member. The drawstrings 12 may be formed of polymeric line or of various wire rope that will effect the cinching and securement of the lines about an associated pipe, in a manner as illustrated in FIG. 3. FIG. 3 notes the use of the hose member 11 positioned in surrounding relationship relative to a pipe member 14 to overlie a rupture opening 15 to maintain sealing of the rupture opening interiorly of the flexible hose member 11.

FIG. 4 is illustrative of a modified hose repair apparatus 10a wherein a modified fabric hose member 16 includes proximate each terminal end a polymeric resilient sealing ring 17. A circumferential pocket is formed in a circumferential surrounding relationship relative to the sealing ring 17, wherein the pocket is formed within the surface of the hose member 16, as illustrated in FIG. 5. The pocket 18 is formed with circumferential slots 19 therearound to receive a drawstring 12 therethrough. The resilient sealing ring 17 and associated structure, as illustrated in FIG. 5, is positioned and formed adjacent each terminal end of the hose member 16 in a positioning comparable to that as illustrated in FIG. 3.

FIG. 6 is illustrative of a further modified hose repair apparatus 10 wherein a flexible exterior hose 20 includes the aforenoted drawstrings 12 formed through their associated circumferential slots 13. Additionally, the further modified hose repair apparatus 10b includes a flexible interior hose 23 (as illustrated in FIG. 7) wherein the flexible interior hose 23 is coaxially positioned interiorly of the exterior hose 20, wherein each terminal end of the interior hose 23 includes heat seams 21 to sealingly heat seam the interior hose 23 relative to the exterior hose 20 to define a pneumatic chamber 24 therebetween. A pneumatic inflation hose 22, with a closure plug, is mounted through the exterior hose 20 in communication with the pneumatic chamber 24 for inflation thereof to effect a back pressure over a weakened but unruptured section of pipe to lessen likelihood of rupture and extend life of the hose in use. The further embodiment of FIG. 7 may also be utilized over a ruptured section of pipe to maintain integrity of remaining pipe wall. FIG. 8 is illustrative of a "T" shaped hose connection 10c of construction comparable to that as defined in FIGS. 2, 4, and 6 to be utilized for repair of pipe or connecting intersections.

FIG. 9 illustrates the end-to-end connection of two distinct pipes to provide a fluid (including air) impermeable sealing relationship between the two pipes as connected together.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hose repair connector apparatus for surroundingly sealing a cylindrical pipe, wherein the apparatus comprises, an elongate cylindrical hose member of a finite predetermined length formed of a fluid impermeable material, wherein the hose member is further defined by spaced terminal ends, and a circumferential series of slots formed to the hose member proximate each terminal end, wherein the circumferential series of slots are orthogonally aligned relative to an axis defined by the hose member, and a flexible drawstring directed through each of the circumferential series of slots for tightening the hose member in a surrounding relationship relative to the pipe, and including a circumferential resilient seal fixedly mounted interiorly of the hose member aligned with each circumferential series of slots, and the circumferential series of slots is formed through the hose member to define a pocket overlying each seal, and each seal is defined as an annular ring with a central aperture therethrough for receiving the pipe in a sealing relationship between the rings, and including an interior hose positioned coaxially relative to and interiorly of the hose member, the interior hose further formed of a fluid impervious flexible material, and wherein the interior hose is of a further predetermined length less than that defined by the predetermined length and spaced interiorly of each circumferential series of slots.

2. An apparatus as set forth in claim 1 wherein the interior hose includes interior hose terminal ends, and each interior hose terminal end is heat seamed to an interior surface of the hose member, and the interior hose is spaced interiorly of the hose member to define a pneumatic chamber member therebetween.

3. An apparatus as set forth in claim 2 further including a pneumatic inflation hose formed through the hose member in communication with the pneumatic chamber, the inflation hose including a plug to seal the inflation hose subsequent to inflation of the pneumatic chamber.

* * * * *